Nov. 24, 1959

W. F. MALKIEWICZ 2,913,919

STEERING AND DAMPING CONTROL DEVICE

Filed March 15, 1956

Inventor
Wladyslaw F. Malkiewicz

Nov. 24, 1959 W. F. MALKIEWICZ 2,913,919
STEERING AND DAMPING CONTROL DEVICE
Filed March 15, 1956 5 Sheets-Sheet 2

Inventor
Wladyslaw F. Malkiewicz
Attys

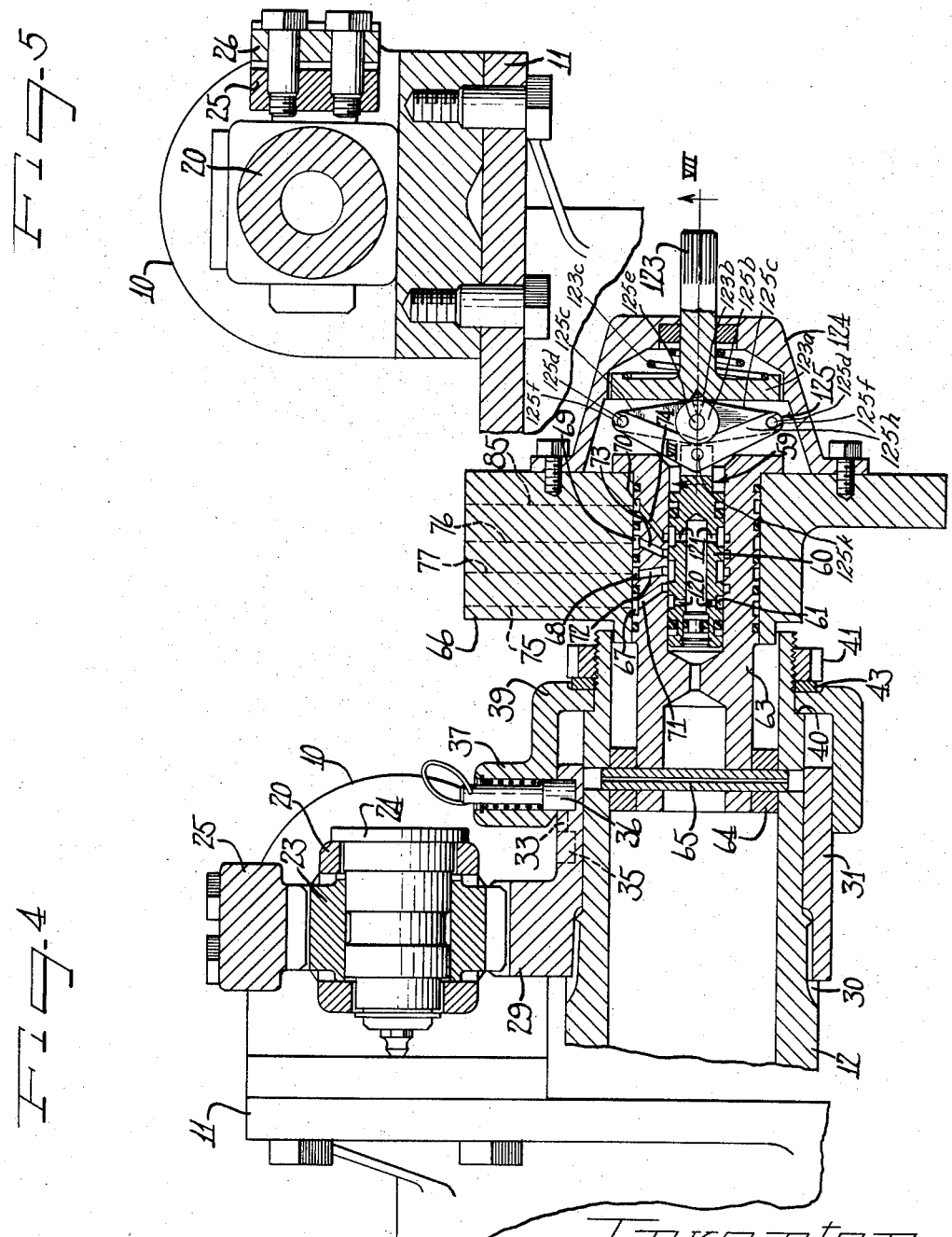

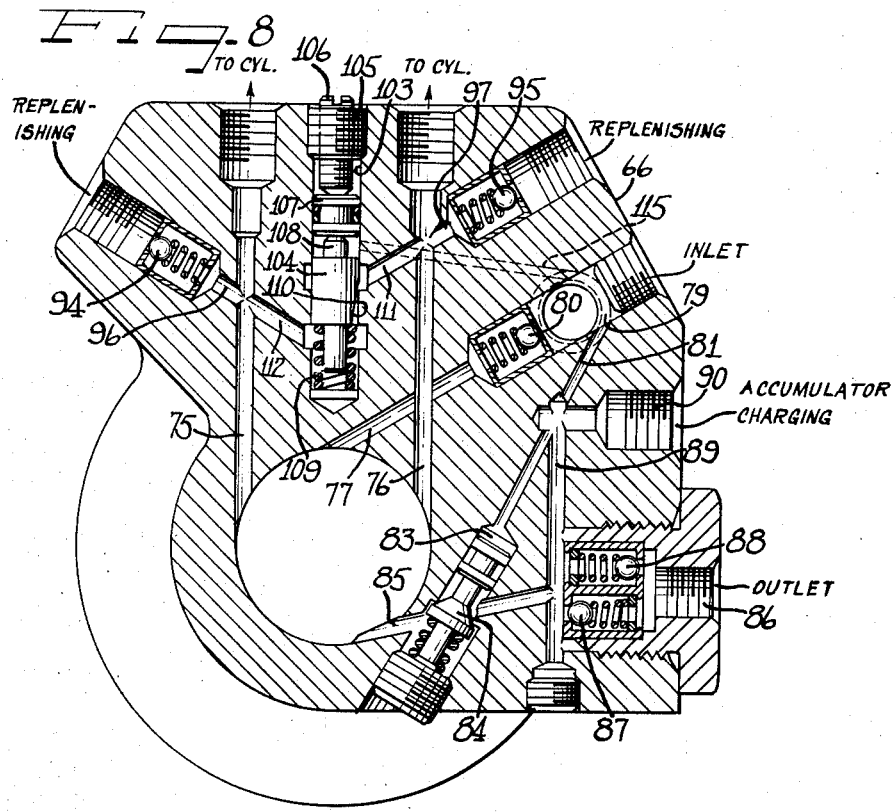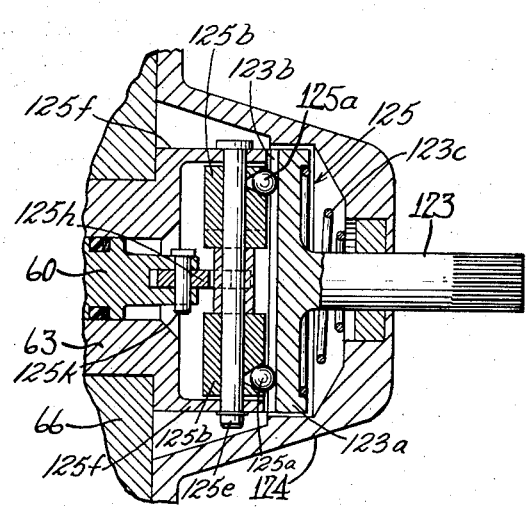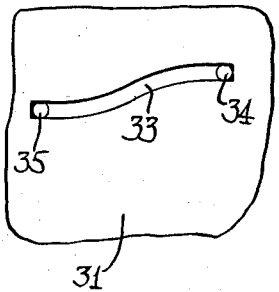

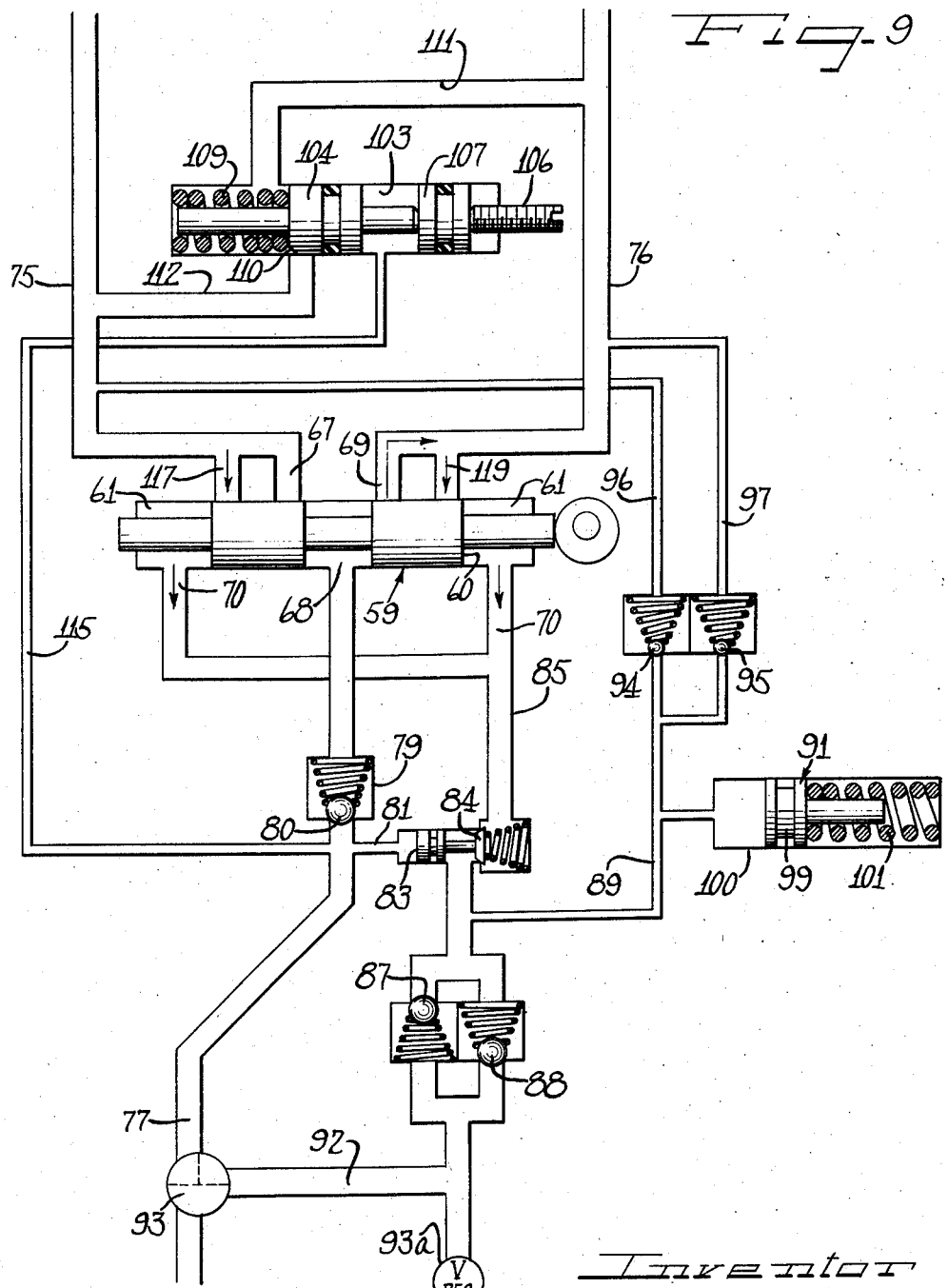

United States Patent Office 2,913,919
Patented Nov. 24, 1959

2,913,919

STEERING AND DAMPING CONTROL DEVICE

Wladyslaw F. Malkiewicz, Toledo, Ohio, assignor to Houdaille Industries, Inc., Highland Park, Mich., a corporation of Michigan Application March 15, 1956, Serial No. 571,717

16 Claims. (Cl. 74—388)

This invention relates to improvements in steering and shimmy dampers and more particularly relates to a linear steer damper particularly adapted for aircraft and the like.

A principal object of the invention is to provide a new and improved form of steer damper in which a linear servo-motor effects steering under the control of servo-valve means and damps the tendency of the wheels to shimmy when the valve means is in a neutral position.

Another object of the invention is to provide a steer damper in which the motion of a linear servo-motor is amplified by an amplifying drive connection to the steering spindle.

Still another object of the invention is to provide a linear steer damper in which the steering spindle returns to a centered position when pressure is released from the damper.

A further object of the invention is to provide a steer damper particuarly adapted for aircraft and the like, so constructed and arranged as to accommodate full castering of the wheels.

A still further object of the invention is to provide a novel and improved form of linear steer damper operable under the control of a servo-valve and having a damping orifice valve associated therewith closing upon operation of the servo-valve and operable as a damping orifice valve upon the release of pressure from the damper.

A still further object of the invention is to provide a novel and improved form of linear steer damper in which steering is effected under the control of a servo-motor and in which damping is effected under the control of an orifice control valve associated with the servo-motor and having an accumulator for replenishing fluid in the damper and charged by fluid in the return line from the steer damper.

A still further and more detailed object of the invention is to provide a novel and efficient form of steer damper in which a servo-motor consisting of two spaced cylinders and pistons having a common piston rod has drive connection with the steering spindle through an amplifying geared drive connection converting the rectilinear motion of the piston rod into rotatable motion and amplifying the motion thereof under the control of a servo-valve, and in which the wheel is returned to a centered position upon the release of pressure from the servo-motor and the lifting of the wheel from the ground.

These and other objects of the invention will appear from time to time as the following specification proceeds and with reference to the accompanying drawings wherein:

Figure 4 is a partial fragmentary sectional view taken substantially along line IV—IV of Figure 1;

Figure 5 is a transverse sectional view taken through the piston rod of the servo-motor and looking toward one of the cylinders of the motor;

Figure 6 is a detail view showing the camming slot for disengaging the gear sector from its splines on the steering spindle, to accommodate full castering of the wheels;

Figure 7 is a fragmentary sectional view taken substantially along line VII—VII of Figure 4;

Figure 8 is a composite schematic sectional view diagrammatically showing the fluid passageways to and from the servo-valve and the damping control valve and showing the replenishing passageways for the damper; and Figure 9 is a diagrammatic view diagrammatically showing the fluid pressure system.

Figure 1:
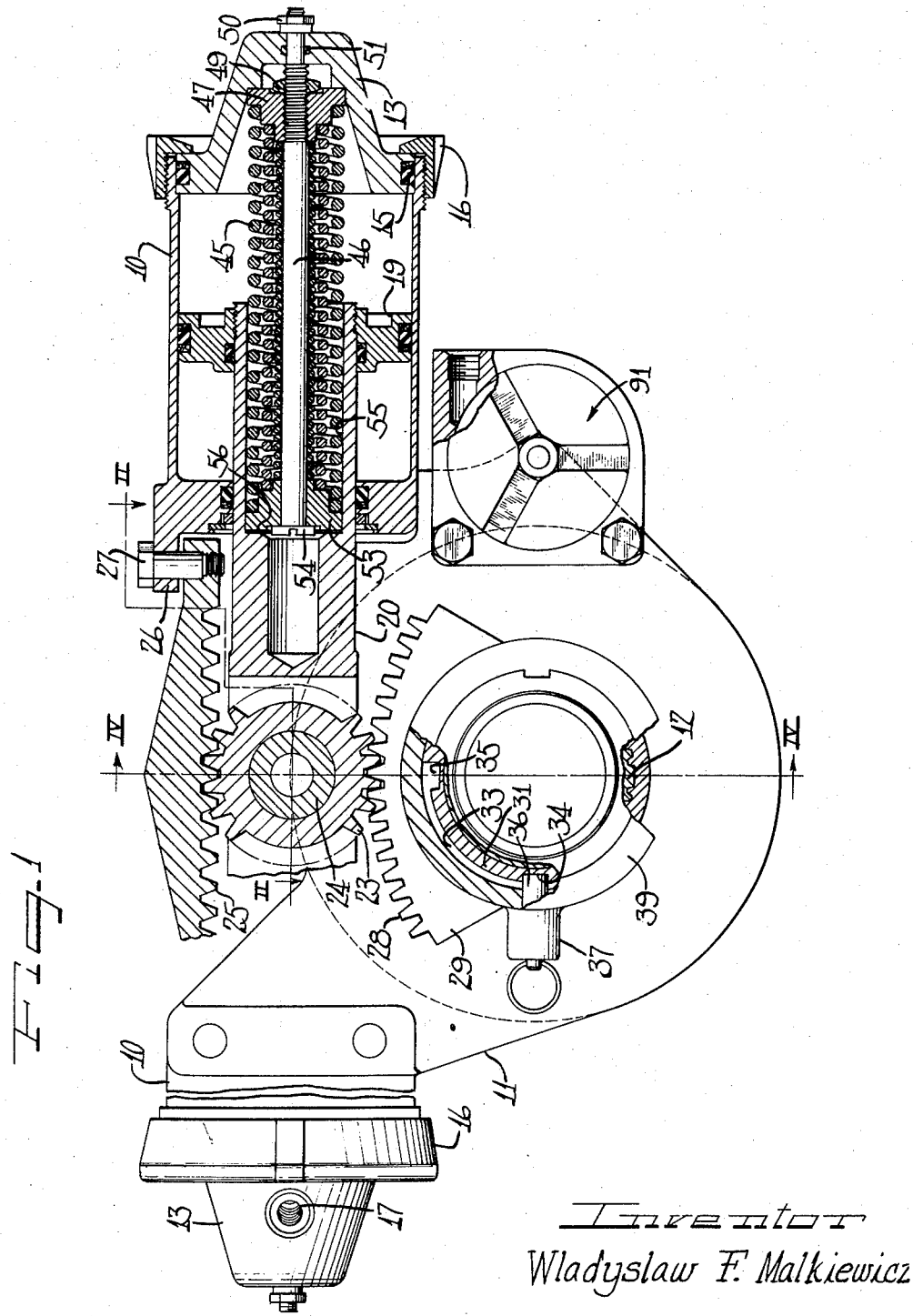
Figure 1 is a fragmentary plan view of a linear steer damper constructed in accordance with the invention, showing the damper connected with a spindle of an aircraft wheel, with certain parts broken away and certain other parts shown in horizontal section.
Figure 2:
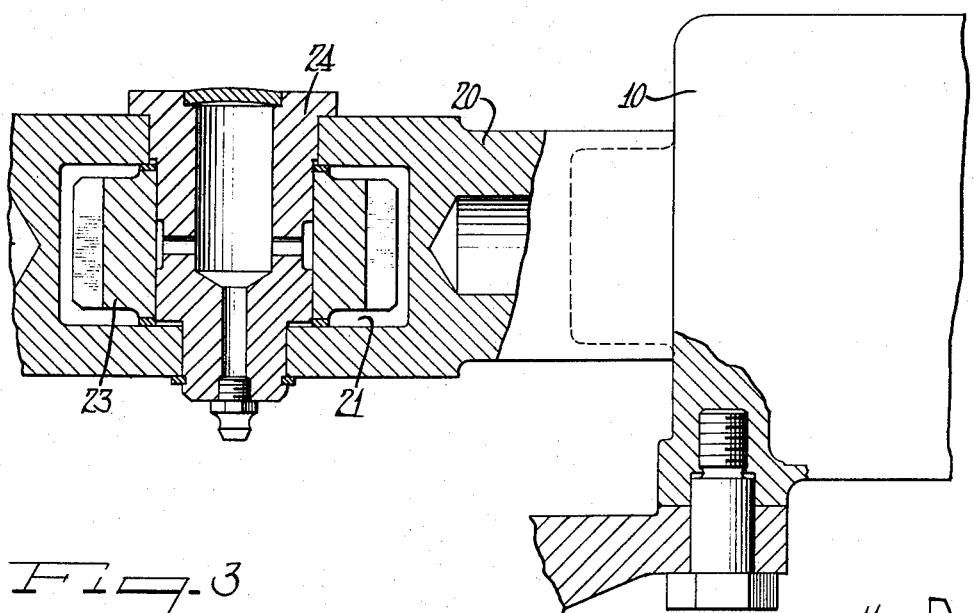
Figure 2 is a fragmentary vertical sectional view taken substantially along line II—II of Figure 1.

In the embodiment of the invention illustrated in the drawings, I have shown two spaced connected axially aligned cylinders 10 mounted on a housing 11 for a spindle 12 for an aircraft wheel (not shown).

Each cylinder 10 is closed at its outer end by an end cap 13 sealed thereto as by an O-ring 15 and retained thereto by a gland nut 16. The end caps 13 each have a passageway 17 leading therethrough for the admission of fluid under pressure and for the release of fluid from either cylinder 10, to move connected pistons 19 along said cylinders. The pistons 19 are secured to a common piston rod 20 as by threading, to form in effect a single double acting piston. While the cylinders 10 and pistons 19 are shown as being single acting it is of course obvious that they may be double acting as well, and that ports may be provided in the piston rod as well as the head ends of the cylinders 10.

The piston rod 20 is shown as having an open or apertured portion 21 intermediate its ends and intermediate the cylinders 10 when the pistons 19 and piston rod 20 are in centered relation with respect to said cylinders. A pinion 23 is journaled in the open portion 21 on a pivot pin 24 carried at its ends in the piston rod 20 on opposite sides of said open portion. The pinion 23 meshes with a stationary rack 25 secured at its opposite ends to ears 26 extending inwardly from the cylinders 10, as by machine screws 27 extending through said ears and shown as being threaded within said rack.

The pinion also meshes with teeth 28 of a gear sector 29 slidably carried on the spindle 12 and splined thereto as by splines 30. The teeth 28 are cut on a parabolic pitch circle to remain in mesh with the teeth of the pinion 23 as said pinion moves along the rack 25. The gear sector 29 has a sleeve 31 extending upwardly therefrom along the spindle 12. The sleeve 31 is internally splined adjacent its lower end, the splines of which mesh with the splines 30. A cam slot 33 extends along the surface of the sleeve 31 for a portion of the circumference thereof and has a locking recess 34 at one end thereof and a locking recess 35 at the opposite end thereof. The locking recesses 34 or 35 are adapted to be engaged by a spring pressed locking pin 36, mounted on a radially projecting boss 37 of a disconnect collar 39 rotatably carried on the spindle 12, adjacent the upper end thereof. The disconnect collar 39 has engagement with a shoulder 40 formed in the spindle 12 adjacent the upper end thereof, and is retained to said spindle as by a nut 41 threaded thereon and abutting a thrust washer 43 recessed within the upper surface of the disconnect collar 39.

When the locking pin 36 is in engagement with the detent or locking recess 34, as shown in Figure 4, the gear sector 29 will be locked into engagement with the splines 30 to effect turning movement of the spindle 12 as the piston rod 20 is extended from either of the cylinders 10.

If, however, it is desired to free the spindle 12 from the gear sector 29 and permit free castering of the wheels, the locking pin 36 is withdrawn from the detent recess 34. The disconnect collar 39 is then rotated to engage the locking pin 36 with the cam slot 33 and thus raise the sleeve 31 along the spindle 12 upon turning movement of said disconnect collar. When the gear sector 29 is out of engagement with splines 30 the locking pin 36 will be urged into the lower detent recess 35 maintaining the gear sector 29 in mesh with the pinion 23 but freeing said gear sector from the splines 30.

A means is provided for centering the spindle 12 and wheel (not shown) thereon upon the release of fluid pressure from either of the cylinders 10 and the lifting of the wheel from the ground, and to center gear sector 29 when disconnected from the spindle 12. Said means is shown in Figure 1 as comprising a plurality of concentric centering springs indicated generally by reference character 45 carried on a rod 46. The centering springs 45 are herein shown as being three in number and are seated at one end on a spring seat 47 threaded on its outer end and locked thereto as by a lock nut 49. The spring seat 47 and rod 46 are maintained into engagement with the end cap 13 as by a nut 50 threaded on the outer end of the rod 46 and abutting the outside of said end cap. An O-ring 51 is provided to seal said rod to said end cap. The springs 45 are seated at their opposite ends on a spring seat 53 mounted on the rod 46 for slidable movement therealong and abutting a head 54 for said rod when the piston rod 20 is in centered relation with respect to the cylinder 10. The inner end of the rod 46 and the spring seat 53 extend within a hollow interior portion 55 of the piston rod 20, and the springs 45 bias the spring seat 53 into engagement with a shouldered portion 56 of the recess 55.

It is understood that centering springs 45 are provided in each cylinder 10 and that the centering devices in each cylinder are balanced and of a similar construction to center the spindle 12 and bring the wheel thereon (not shown) into a zero steer angle upon the release of fluid under pressure from the cylinders 10 as the wheel is lifted from the ground.

A servo-valve 59 is provided to effect steering by the admission of fluid under pressure to either of the cylinders 10. The servo-valve 59 includes a valve spool 60 slidably movable along a valve chamber 61 in a valve body 63 extending within the hollow interior of the spindle 12 from the upper end thereof and spaced radially therefrom by a spacer collar 64. A pin 65 is provided to retain said valve body and spacer collar to said spindle 12. The valve body 63 also extends within a manifold and valve body 66, which may be secured to the spindle housing. The valve body 63 is shown as having four spaced annular passageways 67, 68, 69 and 70 leading therearound, communicating with the valve chamber 61 through drilled passageways 71, 72, 73 and 74 in said valve body. The annular passageways 67 and 69 communicate with pressure passageways 75 and 76, for supplying fluid under pressure to either of the cylinders 10, or for releasing fluid therefrom.

The annular passageway 68 communicates with the inlet passageway 77 in the manifold 66. The inlet passageway 77 has a chamber 79 therein having a ball type of check valve 80 therein, spring biased to block the back flow of fluid along the inlet passageway. A pressure passageway 81 leads from the chamber 79 on the upstream side of the check valve 80 and has communication with a piston 83 of a pressure operated outlet valve 84 in an outlet passageway 85. The outlet valve 84 is spring biased into a closed position and is operated by inlet pressure to open and accommodate the release of fluid through the valve 60 and annular passageway 70 upon operation of the valve spool 60, to pivot the spindle 12 for steering. Upon the release of inlet pressure as by closing of an aircraft control valve 93, the outlet valve 84 closes to provide a self-contained damper with the spool valve 60 in its closed position.

The outlet passageway 85 has fluid communication with a connector 86 leading to the outside of the manifold through two oppositely disposed check valves 87 and 88. The check valve 88 is provided to admit fluid under pressure from a by-pass line 92 through said check valve to a passageway 89 having communication with a threaded connector 90, connected with an accumulator 91 for charging the accumulator by inlet pressure upon operation of the aircraft control valve 93 in the pressure line 77 and a second valve 93a in the return line (see Figure 9). The check valve 87 is so loaded as to build up pressure in the outlet line 85 and to effect charging of the accumulator 91 by outlet pressure (see Figure 9) during the steering operation. The valve 93a may be a spring loaded release valve mounted in the aircraft to maintain a preselected back pressure in line 92.

The accumulator 91 is provided to replenish fluid in the cylinders 10 during the damping operation and is shown as being connected in the outlet line, to be charged by outlet pressure under the control of the check valve 87 through the passageway 89. The passageway 89 has connection with two check valves 94 and 95. The check valves 94 and 95 are biased to accommodate the passage of replenishment fluid from the accumulator therethrough and to prevent the return of fluid from the respective cylinders 10 through the outlet line. Pressure lines 96 and 97 have communication with the pressure lines 75 and 76 on the downstream side of the servovalve 59 to replenish fluid during the steering operation.

Figure 3:
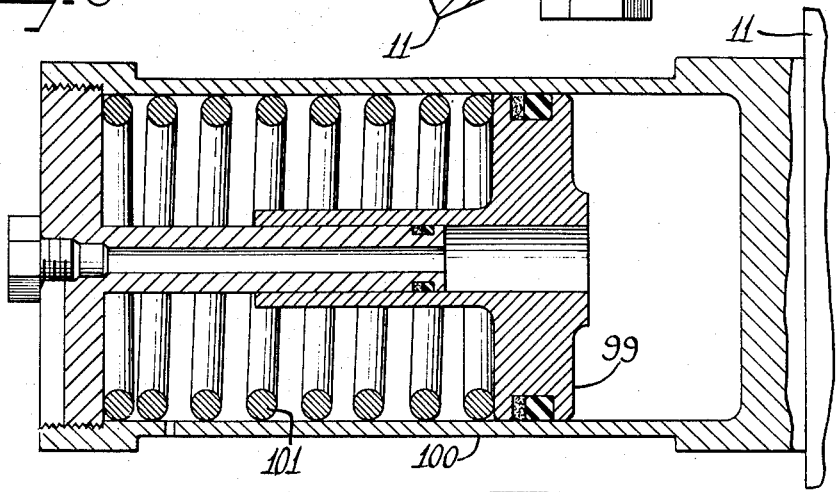
Figure 3 is a sectional view taken through the accumulator for the damping system.

The accumulator 91 may be of any well known form and is shown in Figures 3 and 9 as including a piston 99 within a cylinder 100 biased by a spring 101 to maintain pressure on the replenishment lines 96 and 97, to replenish fluid in the cylinders 10 as required.

The manifold 66 also has a damping chamber 103 having a damping valve 104 therein. A plug 105 threaded within the damping chamber 103 has a stop pin 106 secured thereto and extending inwardly therefrom into engagement with a sealing spool 107. The spool 107 engages a stem 108 of the damping valve. A spring 109 is provided to bias the damping valve into engagement with the spool 107 and stop 106. The damping valve 104 is in the general form of a piston or cylinder and has a chamfer 110 on the face thereof and forming a damping orifice, accommodating the passage of damping fluid from one cylinder to the other through a by-pass line 111 connected with the pressure line 76 and a by-pass line 112 connected with the pressure line 75. A pressure line 115 leads from the pressure line 77 to the opposite side of the damping valve piston from the spring 109, to close the valve 104 whenever there is pressure in the pressure line 77 and the outlet valve 84 is open.

When the aircraft control valve 93 is in a closed position, pressure will be relieved from the valve 104 and pressure line 115 through the valve 93 and by-pass line 92. The spring 109 will then move the valve 104 into an open position. The cylinders 10, the pistons 19 therein and the damping valve 104 will then act as a damping unit, the fluid being by-passed through the by-pass lines 111 and 112 and the damping orifice of the damping valve 104 formed by the chamfer 110. During damping the leakage of fluid past the valve spool 60 is negligible, and any fluid that may leak past said valve spool is retained in the system by the outlet valve 84 and the check valve 80.

The return of fluid from either of the pressure lines 75 or 76 under the control of the valve spool 60 is shown in Figure 9 as being through return lines 117 and 119 connected from the pressure lines 75 and 76 to the valve chamber 61 on the opposite sides of the spools of the valve from the pressure lines 75 and 76. Thus when the valve spool is in a position to the left of the position shown in Figure 9, fluid under pressure will be supplied to the left hand cylinder 10 through the pressure line 75 and released from the pressure line 76 through the return line 119. When the valve spool 60 is positioned to the right of the position shown in Figure 9, fluid under pressure will be admitted to the right hand cylinder 10 through the pressure line 76 and will be released through the return line 117.

In Figure 4 the return is shown as being through the hollow interior of the valve spool 60 through cross-drilled passageways 120 and 121, the passageway 121 communicating with the drilled passageway in the valve body 63, connected with the annular passageway 70 and having connection with the outlet passageway 85, as shown in Figure 8.

The valve spool 60 is moved along the chamber 61 to its various operative positions to each side of the neutral position shown in Figures 4 and 9 by turning movement of an input control shaft 123 rotatably carried in an end cap 124 for the manifold 66. The input control shaft has connection with the valve spool 60 by a motion converting drive 125, converting the rotational movement of said control shaft to rectilinear movement to rectilinearly move the piston along the valve chamber 61 in opposite directions depending upon the direction of rotation of said input control shaft. The motion converting drive 125 includes a disk 123a shown as being formed integrally with the inner end of the input control shaft 123 within the end cap 124 for the manifold 66. The disk 123a has a groove 123b extending diametrically across the inner face thereof. The groove 123b engages balls 125a carried in the grooved portions of grooved rocking members 125b and biased into engagement with the groove portions of said grooved rocking members by a conical spring 123c. Each grooved rocking member 125b has an arm 125c extending laterally therefrom along the inner side of the disk 123a. The arms 125c extend in opposite directions and have pins 125d on their outer ends. The rocking members 125b are supported on a pivot pin 125e mounted at its ends in ears 125f extending outwardly from the valve body 63 within the end cap 124.

The pins 125e engage slots 125g formed on opposite ends of a generally V-shaped yoke 125h pivoted to the valve 59 on a pivot pin 125k extending parallel to the pivot pin 125d.

On turning movement of the input control shaft 123 in one direction, the rocking members 125b will be rocked in opposite directions rocking the arms 125c toward the valve body 63 and moving the valve 59 inwardly. Upon reverse movement of the input control shaft 123 the rocking members 125b will rock in a direction away from the valve body 63 and move the valve 59 to the right.

In operation of the steer damper for steering, the aircraft control valve 93 is turned to an on position. Fluid under pressure will then open the outlet valve 84 and close the damping valve 104 against the spring 109. Fluid will also be supplied to the spool valve 60 through the check valve 80. Upon the movement of the rudder control (not shown) in one direction or another, the input control shaft 123 will be turned in a corresponding direction, to move the valve spool 60 to supply fluid under pressure through either of the pressure lines 75 or 76 to the cylinder chamber, connected therewith, to effect rectilinear movement of the piston rod 20 in one direction or another and movement of the pinion 23 along the teeth of the rack 25. This will effect turning of the parabolic gear sector 29 and the spindle 12 at an amplified angular travel from the linear travel of the piston rod 20.

In the form of the invention shown the parabolic gear sector 29 may move the spindle 12 70° in either direction upon movement of the piston rod 20 to its full extent of travel in either direction, although it will readily be understood that the amount of the steering movement may be varied by varying the form of gear sector the length of stroke of the piston rod 20 and the length of travel of the pinion therealong as required.

When the valve 60 is moved to a neutral position and the aircraft control valve 93 is turned to an off position, there will be no fluid pressure available to drive the piston rod 20 and pinion 23. The relief of pressure from the piston 83 of the outlet valve 84, and the relief of pressure from the damping valve 103 will effect closing of said outlet valve and movement of the damping valve 104 into a position to by-pass fluid from the line 111 to the line 112 through the damping orifice formed by the chamfer 110 on the piston 104.

As pressure is relieved from the cylinders 10, and assuming the wheel (not shown) on the spindle is off the ground, the centering springs 45 will move the spindle 12 to a zero steering angle.

The unit then becomes a self-contained damper with the chamfer 110 forming the energy absorption orifice of the damper, as the fluid is passed therealong in one direction or another through the by-pass lines 111 and 112. Any fluid, however, which may leak past the damping control valve 60 will be stopped by the outlet valve 84 and the check valve 80. Fluid may be continuously replenished by the accumulator 91, supplying fluid to the pressure lines 75 and 76 through the check valves 94 and 95 and the replenishing lines 96 and 97.

It should here be understood that the valve 60 need not be in the neutral position shown in Figure 9 in order for damping to take place. The primary requirement is that pressure be relieved from the pressure lines 77, 81 and 115 by closing the valve 93. The outlet valve 84 and check valve 80 will close the damping system and permit damping to take place as long as the valve 91 is closed.

When it is desired to have full castering of the wheel (not shown) on the spindle 12, as where the aircraft is to be towed or stowed, the pin 36 may be withdrawn from the locking notch 34 and the disconnect collar 39 may be turned to register the pin 36 with the inclined cam slot 33. Continued movement of the disconnect collar 39 will then disengage the gear sector 29 from the splines 30 to accommodate free turning movement of the spindle 12 within the spindle housing 11. Upon disconnection of the gear sector 29 from the splines 30, assuming pressure has been released from the cylinders 10, the centering springs 45 will center the piston rod 20 and the gear sector 29 at zero steer angle regardless of the position of said gear sector when disconnected from the splines 30 at steering angles other than zero. The springs 45, of course center the gear sector 29 and spindle 12 whenever pressure is relieved from the cylinders 10 and the wheels are lifted from the ground, as has previously been described.

It should further be understood that the accumulator 91 may be charged during operation of the damper for steering by means of outlet pressure under the control of the check valve 87. The accumulator 91 may also be charged by inlet pressure under the control of the aircraft control valves 93 and 93a.

While I have herein shown and described one form in which my invention may be embodied, it will be understood that various modifications and variations in the invention may be effected without departing from the spirit and scope of the novel concepts thereof, and that I do not wish to be construed as limiting myself to the specific embodiment illustrated except as defined by the claims appended hereto.

I claim as my invention:

1. In a steering and damping control device, a steering spindle, a linear servo-motor, servo-valve means for supplying fluid under pressure to said servo-motor for operating the same, and a motion translating and multiplying drive connection from said servo-motor to said steering spindle comprising a stationary rack, a rectilinearly movable pinion meshing with said rack and driven therealong by said servo-motor upon the supply of fluid under pressure thereto, and a gear sector on said steering spindle meshing with said pinion and rotatably moved thereby an amplified distance from the length of travel of said pinion.

2. In a steering and damping control device, a steering spindle, a linear servo-motor, servo-valve means for supplying fluid under pressure to said servo-motor for operating the same, a motion translating and multiplying drive connection from said servo-motor to said steering spindle comprising a stationary rack, a pinion meshing with said rack and moved along said rack by said servo-motor, and a parabolic gear sector on said spindle meshing with said pinion and driven thereby for pivotally moving said steering spindle about an arc greater than the length of travel of said pinion.

3. In a steering and damping control device, a steering spindle, a linear servo-motor, servo-valve means for supplying fluid under pressure to said servo-motor for operating the same, a motion translating and multiplying drive connection from said servo-motor to said steering spindle comprising a stationary rack, a pinion meshing with said rack and moved therealong by said servo-motor upon the supply of fluid under pressure thereto, a gear sector on said steering spindle meshing with said pinion for pivotally moving said steering spindle upon movement of said pinion along said rack, said gear sector being splined on said steering spindle and being movable therealong, and means operable to disconnect said gear sector from its splined connection on said steering spindle and to hold said gear sector in disconnected relation with respect to said steering spindle, to accommodate free movement of said steering spindle.

4. In a steering and damping control device, a steering spindle, a linear servo-motor, servo-valve means for supplying fluid under pressure to said servo-motor for operating the same, a motion translating and multiplying drive connection from said servo-motor to said steering spindle comprising a stationary rack, a pinion meshing with said rack and moved therealong by said servo-motor upon the supply of fluid under pressure thereto, a gear sector on said steering spindle meshing with said pinion for pivotally moving said steering spindle upon movement of said pinion along said rack, said gear sector being splined on said steering spindle, and being movable therealong, and means operable to disconnect said gear sector from its splined connection on said steering spindle and to hold said gear sector in disconnected relation with respect to said steering spindle, to accommodate free movement of said steering spindle, comprising a disconnect collar on said steering spindle, a camming slot on said gear sector having locking notches at each end thereof and a pin on said disconnect collar engageable with said locking notches for maintaining said gear sector in the desired position with respect to said steering spindle, said pin having slidable engagement with said camming slot for raising or lowering said gear sector with respect to the splines on said spindle upon turning movement of said disconnect collar.

5. In a steering and damping control device, a steering spindle, a linear servo-motor, servo-valve means for supplying fluid under pressure to said servo-motor for operating the same, a motion translating and multiplying drive connection from said servo-motor to said steering spindle comprising a stationary rack, a pinion meshing with said rack and moved therealong by said servo-motor upon the supply of fluid under pressure thereto, a gear sector on said steering spindle meshing with said pinion for pivotally moving said steering spindle upon movement of said pinion along said rack, said gear sector being splined on said steering spindle and being movable therealong, and means operable to disconnect said gear sector from its splined connection on said steering spindle and to hold said gear sector in disconnected relation with respect to said steering spindle, to accommodate free movement of said steering spindle, and centering means centering said gear sector and servo-motor upon the release of pressure from said servo-motor and the release of the reaction of steering against the ground from said gear sector.

6. In a steering and damping control device, a steering spindle, a linear servo-motor, a source supply of fluid under pressure including pressure lines leading to said motor and a servo-valve controlling the supply of fluid under pressure to said servo-motor through said pressure lines, a piston rod rectilinearly moved by said servo-motor in opposite directions upon the supply of fluid under pressure thereto, a stationary rack, a pinion rotatably mounted on said piston rod and meshing with said rack, a parabolic gear sector meshing with said pinion, for pivoting said steering spindle, a damping control valve connected across said pressure lines, and a fluid pressure line connected with said damping control valve for moving said valve into a closed position upon the operation of said servo-valve to operate said servo-motor, and releasing said damping control valve to by-pass fluid past said servo-valve upon the release of fluid under pressure from said servo-valve.

7. In a combined steering and damping control device, a steering spindle, a double acting linear servo-motor, a motion translating and multiplying drive connection from said servo-motor to said steering spindle, a servo-valve, pressure lines leading from said servo-valve to said servo-motor, pressure and return lines leading to said servo-valve, a damping control valve connected to said pressure lines leading to said servo-motor for by-passing fluid past said servo-valve, and having an energy absorbing damping orifice therein, and an accumulator in said return line having connection with said pressure lines leading to said servo-motor for replenishing fluid therein, said accumulator being charged by pressure in said return line.

8. In a steering and damping control device, a steering spindle, a double acting linear servo-motor having a piston rod, a motion translating and multiplying drive connection from said piston rod to said steering spindle, a servo-valve, pressure lines leading from said servo-valve to said servo-motor, pressure and return lines leading to and from said servo-valve, a damping orifice control valve connected with said pressure lines leading to said servo-motor and providing an energy absorbing damping orifice by-passing said servo-valve, an accumulator connected in said return line and connected with said pressure lines leading to said servo-motor for replenishing fluid therein, and check valve means in said return line on the downstream side of said accumulator and loaded to build up pressure in said return line and charge said accumulator by the pressure of fluid passing through said return line.

9. In a steering and damping control device, a steering spindle, a double acting linear servo-motor having a piston rod, a motion translating and multiplying drive connection from said piston rod to said steering spindle, a servo-valve, pressure lines leading from said servo-valve to said servo-motor, pressure and return lines leading to and from said servo-valve, a damping orifice control valve connected with said pressure lines leading to said servo-motor and providing an energy absorbing damping orifice by-passing said servo-valve, an accumulator connected in said return line and connected with said pressure lines leading to said servo-motor for replenishing fluid therein, an outlet valve in said return line biased into a closed position, a pressure line from said pressure line leading to said servo-valve for opening said outlet valve upon the supply of fluid under pressure to said servo-valve, and a second pressure line leading from said pressure line leading to said servo-valve having connection with said damping valve for closing said damping valve upon the supply of fluid under pressure to said servo-valve and the opening of said outlet valve.

10. In a steering and damping control device, a steering spindle, a double acting linear servo-motor having a piston rod, a motion translating and multiplying drive connection from said piston rod to said steering spindle, a servo-valve, pressure lines leading from said servo-valve to said servo-motor, pressure and return lines leading to and from said servo-valve, a damping orifice control valve connected with said pressure lines leading to said servo-motor and providing an energy absorbing damping orifice by-passing said servo-valve, an accumulator connected in said return line and connected with said pressure lines leading to said servo-motor for replenishing fluid therein, two oppositely acting check valves in said return line on the downstream side of said accumulator, an aircraft control valve in said pressure line for supplying pressure to said servo-valves, one of said check valves blocking the flow of fluid through said outlet valve in an outlet direction and the other of said check valves being loaded to build up pressure in said outlet line sufficient to charge said accumulator by outlet pressure, and the fluid pressure connection from said aircraft control valve to said return line accommodating the charging of said accumulator by the pressure in said pressure supply line to said servo-valve.

11. In a combined steer and shimmy damping control device, a steering spindle, two spaced aligned cylinders having pistons therein, a common piston rod connecting said pistons together, a motion translating and amplifying geared drive connection from said piston rod to said spindle including a stationary rack, a pinion on said piston rod meshing with said rack and movable therealong, and a gear segment on said spindle meshing with said pinion and driven thereby for pivoting said spindle in steering directions.

12. In a combined steer and shimmy damping control device, a steering spindle, two spaced aligned cylinders having pistons therein, a common piston rod connecting said pistons together, a motion translating and multiplying geared drive connection from said piston rod to said spindle comprising a stationary rack connected to said cylinders, a pinion rotatably carried on said piston rod and meshing with said rack, and a parabolic gear segment on said spindle and meshing with and driven by said pinion upon rectilinear movement of said piston rod.

13. In a combined steer and shimmy damping control device, a steering spindle, two spaced aligned cylinders having pistons therein, a common piston rod connecting said pistons together, a servo-valve connected with said cylinders for supplying fluid under pressure to and releasing fluid under pressure from said cylinders for moving said piston rod in steering directions, an amplifying geared drive connection from said piston rod to said steering spindle comprising a stationary rack connected between said cylinders, a pinion rotatably carried on said piston rod and meshing with said rack, a gear segment splined on said spindle and meshing with said pinion, and means for disconnecting said gear segment from the splines on said spindle comprising a disconnect collar rotatably mounted on said cylinder and an interengaging connection between said collar and spindle including a locking pin and a cam surface engageable by said pin and operable to move said gear segment out of splined engagement with said spindle upon turning movement of said disconnect collar in one direction.

14. In a combined steer and shimmy damping control device, a steering spindle, two spaced aligned cylinders having pistons therein, a common piston rod connecting said pistons together, a servo-valve, pressure lines leading from said servo-valve to said cylinders for supplying fluid under pressure to and releasing fluid under pressure from said cylinders, an amplifying geared drive connection from said piston rod to said steering spindle comprising a stationary rack connected between said cylinders, a pinion rotatably carried on said piston rod and meshing with said rack, and a parabolic gear segment splined on said spindle, centering means within said cylinders for centering said steering spindle upon the release of fluid under pressure from said cylinders and the release of the reaction against steering from said steering spindle, and a damping valve connected across said pressure lines and maintained closed by pressure upon the operation of said servo-valve to supply fluid under pressure to either of said cylinders and opening upon the release of fluid under pressure to said servo-valve and by-passing said servo-valve and with said cylinders and pistons forming a self-contained damping unit.

15. In a steering and shimmy damping control device, a steering spindle, a linear servo-motor having a rectilinearly movable piston rod, a motion multiplying drive connection from said piston rod to said steering spindle translating the rectilinear motion of said piston rod into rotational movement and amplifying the motion of said piston rod, servo-valve means for supplying fluid under pressure to said servo-motor in accordance with steering requirements, pressure lines leading from said servo-valve means to said servo-motor for supplying fluid under pressure thereto, an orifice control valve connected across said pressure lines, and means operable by the release of pressure from said pressure lines for moving said orifice control valve into position to by-pass fluid past said servo-valve means and to form a damping energy absorbing valve converting said servo-motor to a self-contained damping unit.

16. In a steering and damping control device, a steering spindle, a linear servo-motor, a motion translating and multiplying drive connection from said servo-motor to said steering spindle, servo-valve means, pressure lines from said servo-valve means to said servo-motor for supplying fluid under pressure thereto to operate said servo-motor for steering, a damping orifice control valve connected across said pressure lines and forming an energy absorbing damping orifice control valve, a fluid pressure connection to said damping orifice control valve maintaining said orifice control valve in position to block the flow of fluid between said pressure lines past said orifice control valve upon operation of said servo-valve and said servo-motor for steering, and spring means moving said orifice control valve in position to by-pass fluid between said pressure lines past said servo-valve upon the release of fluid under pressure from said servo-valve.

References Cited in the file of this patent

UNITED STATES PATENTS

| | | |
|---|---|---|
| 1,712,089 | Miles | May 7, 1929 |
| 1,862,173 | Bertram | June 7, 1932 |
| 2,324,750 | Wiedmann | July 20, 1943 |
| 2,372,710 | Chisholm | Apr. 3, 1945 |
| 2,404,639 | Lane | July 23, 1946 |
| 2,491,945 | Baker | Dec. 20, 1949 |
| 2,627,187 | Davis | Feb. 3, 1953 |
| 2,654,347 | Clark | Oct. 6, 1953 |
| 2,762,585 | Eaton | Sept. 11, 1956 |